D. B. SALSTROM.
SPINDLE AND BEARING.
APPLICATION FILED MAR. 1, 1917.
1,266,056.
Patented May 14, 1918.
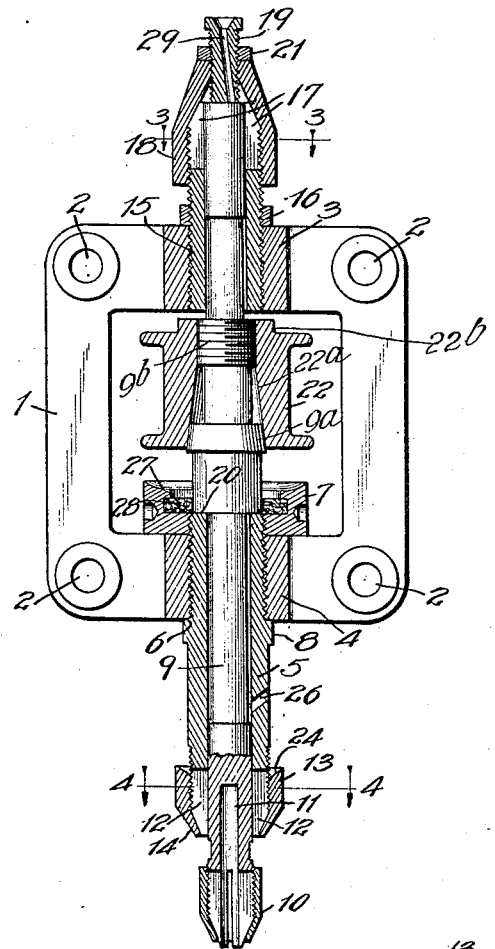
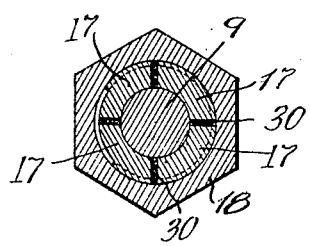
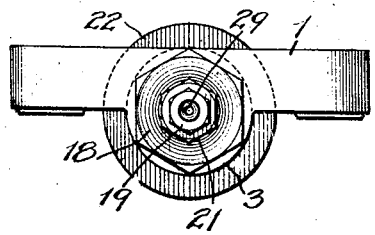
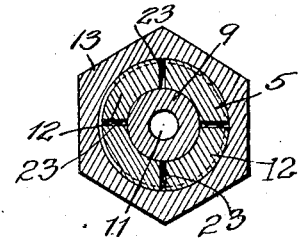
Witnesses:
W. P. Kilroy
Harry R. L. White
Inventor:
David B. Salstrom
By Miller, Chindahl, Parker
Attys.

UNITED STATES PATENT OFFICE.

DAVID B. SALSTROM, OF CHICAGO, ILLINOIS, ASSIGNOR TO E. KOPRIWA COMPANY, OF CHICAGO, ILLINOIS, A CORPORATION OF ILLINOIS.

SPINDLE AND BEARING.

1,266,056.   Specification of Letters Patent.   Patented May 14, 1918.

Application filed March 1, 1917. Serial No. 151,631.

*To all whom it may concern:*

Be it known that I, DAVID B. SALSTROM, a citizen of the United States, residing at Chicago, in the county of Cook and State of Illinois, have invented certain new and useful Improvements in Spindles and Bearings, of which the following is a specification.

This invention relates to improvements in the class of devices shown in my prior Patent No. 1,013,847, granted January 2, 1912.

Among the objects of the invention are to provide a unitary or self-contained construction which shall facilitate application of the spindle and its bearings to the movable head of a wood-carving machine or other mechanism; to reduce vibration to a minimum; and to provide for proper lubrication.

In the accompanying drawings Figure 1 is an elevation, many of the parts, however, being shown in longitudinal central cross section. Fig. 2 is a top plan view. Fig. 3 is a transverse sectional view, slightly enlarged, on line 3—3, Fig. 1. Fig. 4 is a transverse sectional view, slightly enlarged, on line 4—4, Fig. 1.

In the embodiment herein shown, the spindle and its bearings are carried by a base 1 which may have the form of a rectangular frame and which may be adapted in any suitable manner to be secured to the movable head of a wood-carving machine. Herein are shown screw-holes 2 in the corners of the base 1.

The base is provided with an upper boss 3 and a lower boss 4, said bosses having alined internally-threaded openings to receive the bearing elements. Preferably the bosses 3 and 4 are cast integral with the base 1. In the boss 4 is screwed a bearing bushing or sleeve 5, said sleeve having a shoulder 6 arranged to stop against the lower side of the boss 4. 7 is a lock-nut screwed upon the upper end of the sleeve 5 and seated against the upper side of the boss 4. The sleeve 5 may be provided at a suitable point with a polygonal wrench-receiving surface 8.

The spindle 9 is rotatably mounted within the sleeve 5. The lower end of the spindle is provided with a chuck 10 of any suitable construction for securing the shank of the cutter in the axial bore 11 of the spindle. The lower end of the sleeve 5 is radially slotted to provide any desired number of resilient devices or fingers 12 surrounding the spindle, the lower end of said fingers being exteriorly tapered, as shown. Above said tapered portion the sleeve 5 is provided with screw threads to receive a nut 13 having a lower tapered portion 14 arranged to engage the tapered surface of the fingers 12 and contract said fingers into close contact with the spindle 9.

In the upper boss 3 is screwed a bearing bushing 15 in which the upper end of the spindle is rotatably mounted. 16 is a lock-nut screwed on the bushing 15 and seated against the upper end of the boss 3 for securing the bushing 15 in place. The upper end of the bushing 15 is radially slotted to provide a plurality of resilient fingers 17, the upper ends of which fingers are tapered. Below the tapered portion of the fingers 17 the bushing 15 is exteriorly threaded to receive a sleeve or nut 18, said sleeve having an interiorly tapered portion arranged to engage the tapered surface of the fingers 17 to compress said fingers into close contact with the upper end portion of the spindle.

To prevent longitudinal movement of the spindle 9, I provide a screw 19 seated in the end of the nut 18 and alined with and bearing against the end of the spindle. This screw holds an annular shoulder 20 upon the spindle in contact with the upper end of the sleeve 5. The screw 19 is fixed in adjusted position by means of a lock-nut 21.

22 is a flanged pulley or sheave rigidly secured in a suitable manner to the spindle 9 between the boss 3 and the nut 7. Preferably the spindle is provided with a tapered surface $9^a$ upon which fits a correspondingly tapered interior surface $22^a$ of the pulley. Above the tapered surface $9^a$ the spindle has screw threads $9^{b'}$ engaging the pulley, said threads being of such inclination that in the rotation of the pulley the tendency is to screw the pulley into place. The pulley is provided with a wrench-receiving surface $22^b$.

In operation, the spindle 9 is rotated at very high speed. The production of smooth accurate work requires that vibration of the spindle be eliminated or reduced to the least possible amount. The construction herein shown has proved to be very satisfactory in this respect, as the nuts 13 and 18 cause the spindle to be very firmly held at two separated points against side movement. Longitudinal movement of the spindle is effectively prevented by the screw 19 and the shoulder 20.

The tightness with which the fingers 12 and 17 necessarily embrace the spindle has entailed difficulties in lubrication which have been overcome in the following manner: The slots that separate the fingers 12 are filled with strips of felt 23 (Fig. 4). These felt strips are omitted in Fig. 1 for the sake of clearness. The upper end of the nut 13 is interiorly tapered or hollowed to provide a trough 24 to receive lubricating oil. From the trough 24 the oil is absorbed by the strips of felt 23 and is thus slowly conducted in minute quantities to the portion of the periphery of the spindle 9 which is embraced by the fingers 12. At suitable intervals of time a small quantity of oil may, if desired, be introduced through the oil hole 26.

The upper end of the nut 7 is recessed to form an oil trough 27. Below said trough the nut 7 is annularly chambered to receive a ring 28 of felt or the like, said ring lying in contact with the periphery of the spindle 9 above the shoulder 20. Oil from the ring 28 creeps beneath the shoulder 20 and keeps said shoulder and the upper end of the sleeve 5 lubricated.

Lubrication of the bearing for the upper end of the spindle is effected by means of an oil duct 29 formed in the nut 19, said duct being inclined so as to discharge oil at a point eccentric of the lower end of the screw. The lower end of the screw 19 and the upper end of the spindle 9 are thus lubricated. Oil flowing from between said surfaces saturates the felt strips 30, said strips being located in the slots between the fingers 17. (See Fig. 3). The felt strips 30 lubricate the periphery of the upper end portion of the spindle 9.

The felt strips 23 and 30 and the felt ring 28 serve to strain the oil and prevent dust from reaching the bearing surfaces.

I claim as my invention:

1. The combination of a bearing bushing, one end of said bushing being contractible, a spindle rotatably mounted in the bushing, a nut having a tapered portion arranged to contract the bushing into engagement with the spindle, and a screw carried by said nut in alinement with the spindle and bearing against the end of the spindle for limiting endwise movement of the spindle in one direction.

2. The combination of two alined bearing bushings, the remote ends of which are slotted to provide resilient portions, a spindle rotatably mounted in said bushings, means for contracting said resilient portions into engagement with the spindle, and means for preventing longitudinal movement of the spindle.

3. The combination of a bearing bushing, one end of which is contractible, a spindle mounted in said bushing, means for contracting the bushing into engagement with the spindle, said spindle having an annular shoulder, and means for holding said shoulder in contact with the end of the bushing.

4. The combination of a bearing bushing, a spindle rotatably mounted in the bushing, a boss into which the bushing is screwed, a lock nut screwed on the end of the bushing and bearing against the boss, said lock nut having an annular chamber, and a ring of absorbent material located in said chamber and surrounding the spindle, said nut being shaped to conduct oil to said ring.

5. The combination of a base having screw holes therein, two alined bosses on said base, bearing bushings secured in said bosses, a spindle rotatably mounted in said bushings, means carried by the bushings for holding the spindle against lateral and endwise movement, and a pulley fixed on the spindle at a point between said bushings.

6. The combination of a base, two alined bearings on the base, a spindle rotatably mounted in said bearings, means carried by the bearings for holding the spindle against lateral movement, means adjustable longitudinally of the spindle for holding it against endwise movement, and a pulley fixed on the spindle at a point between said bearings.

7. The combination of a bearing, a spindle rotatably mounted in said bearing, devices adjustable radially of the spindle to coördinately engage therewith at a plurality of substantially equidistant points in its periphery for holding it against lateral movement, and means adjustable longitudinally of the spindle for holding it against endwise movement.

In testimony whereof, I have hereunto set my hand.

DAVID B. SALSTROM.

Copies of this patent may be obtained for five cents each, by addressing the "Commissioner of Patents, Washington, D. C."